United States Patent [19]

Heróux

[11] Patent Number: 4,458,107

[45] Date of Patent: Jul. 3, 1984

[54] METHOD AND APPARATUS FOR ELIMINATING PULSATORY DISCHARGES OF THE CORONA EFFECT ALONG AN ELECTRIC POWER LINE WHEN THE CONDUCTORS ARE WET

[75] Inventor: Paul Heróux, Longueuil, Canada

[73] Assignee: Hydro Quebec, Montreal, Canada

[21] Appl. No.: 327,077

[22] Filed: Dec. 3, 1981

[30] Foreign Application Priority Data

Apr. 27, 1981 [CA] Canada .................................. 376,258

[51] Int. Cl.³ .......................... H01B 5/08; H02G 7/00
[52] U.S. Cl. ................................ 174/127; 174/124 R; 174/128 R; 174/130
[58] Field of Search ............... 174/124 R, 127, 128 R, 174/130

[56] References Cited

U.S. PATENT DOCUMENTS

| 239,070 | 3/1881 | Splitdorf ......................... | 174/124 R |
| 511,547 | 12/1893 | Randall ........................... | 174/124 R |
| 2,092,477 | 9/1937 | Scott et al. ....................... | 174/124 R |
| 2,644,029 | 6/1953 | Travis ............................... | 174/124 R |
| 3,930,113 | 12/1975 | Johansen et al. .................... | 174/130 |
| 4,147,890 | 4/1979 | Rabinowitz et al. ............... | 174/127 |

FOREIGN PATENT DOCUMENTS

| 1397779 | 6/1975 | United Kingdom ................ | 174/127 |
| 819820 | 4/1981 | U.S.S.R. ............................. | 174/130 |

OTHER PUBLICATIONS

Comber, M. G. and Zaffarella, L. E.; Audible-Noise Reduction by Bundle Geometry Optimization; General Electric Co.; Paper IEEE PES Winter Meeting; New York, N.Y., Jan. 28-Feb. 2, 1973.

Primary Examiner—J. V. Truhe
Assistant Examiner—Morris H. Nimmo
Attorney, Agent, or Firm—Schwartz, Jeffery, Schwaab, Mack, Blumenthal & Koch

[57] ABSTRACT

According to the method, a strip of nonconductive, fibrous material having a capillary effect with respect to water is fixed in close contact with each conductor of the transmission line. The capillary effect of the fibrous material ensures the formation of thin filaments of water on the surface of the conductor when the same is wet. These filaments of water promote the generation of a corona effect in the form of permanent discharges resulting in a luminescent phenomena and inhibit the occurrence of pulsatory discharges. A conductor for aerial, high voltage, electric power transmission line which allows the above method to be carried out, is also disclosed.

6 Claims, 9 Drawing Figures

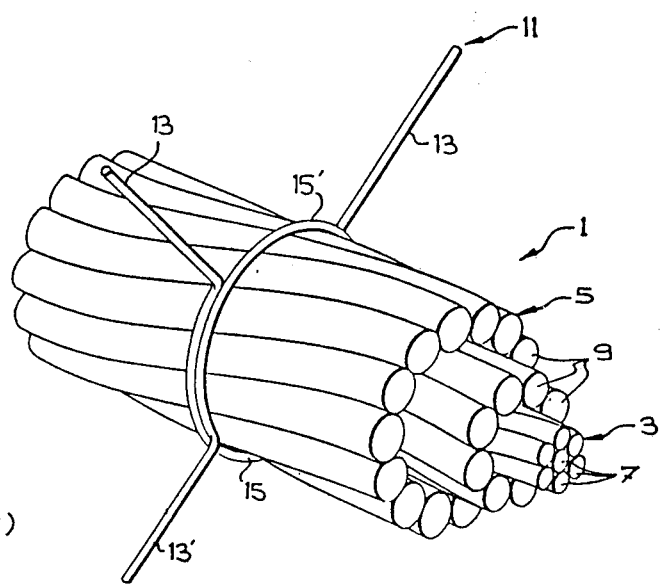
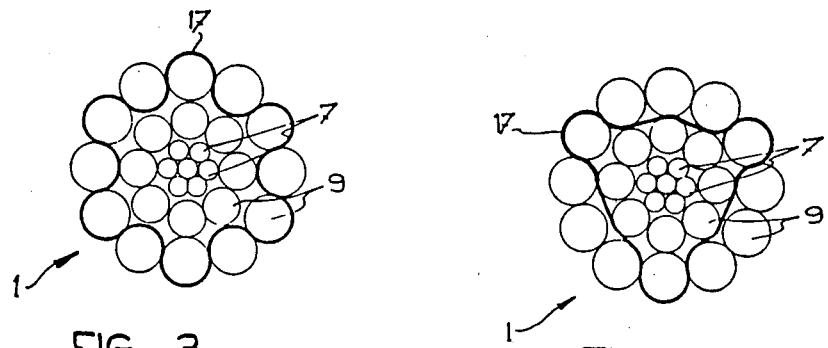
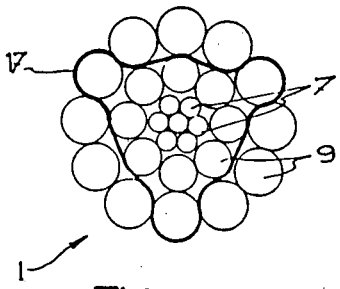
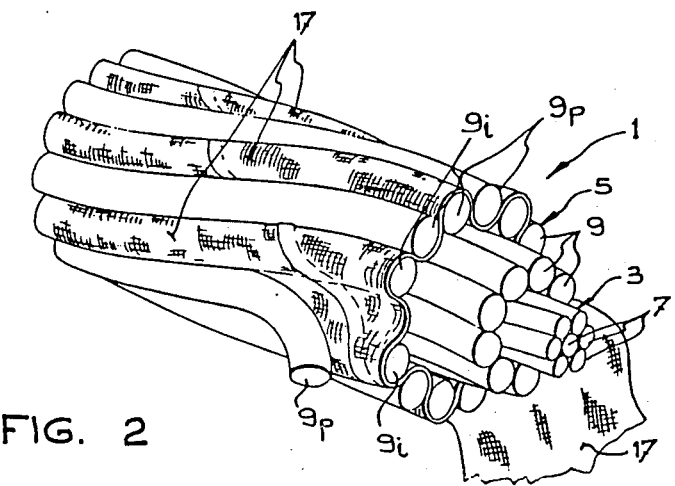
FIG. 1 (PRIOR ART)
FIG. 3
FIG. 4
FIG. 2

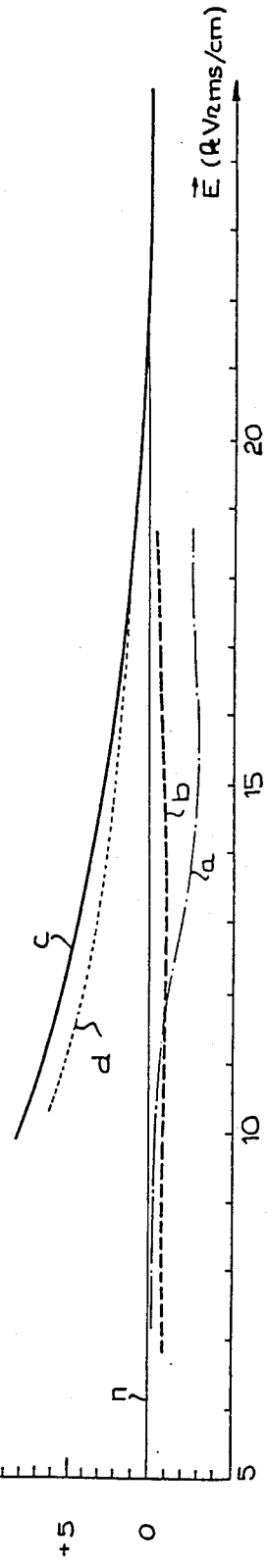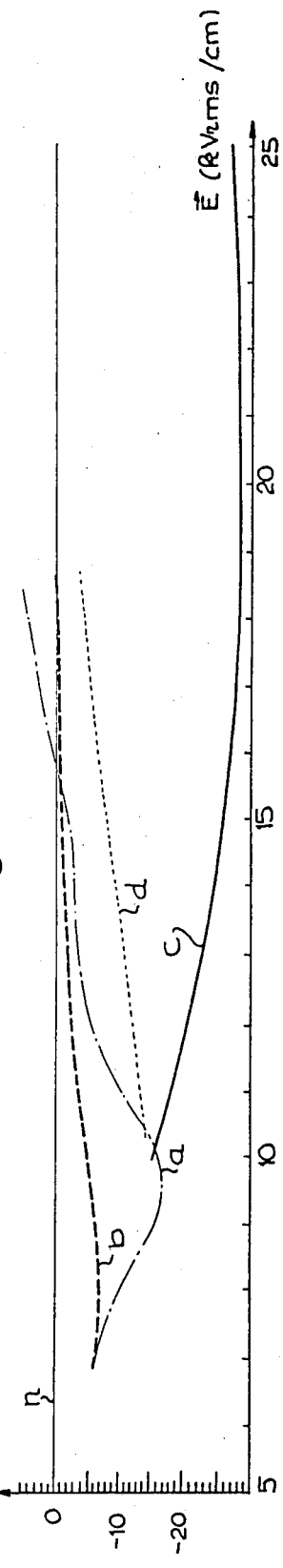

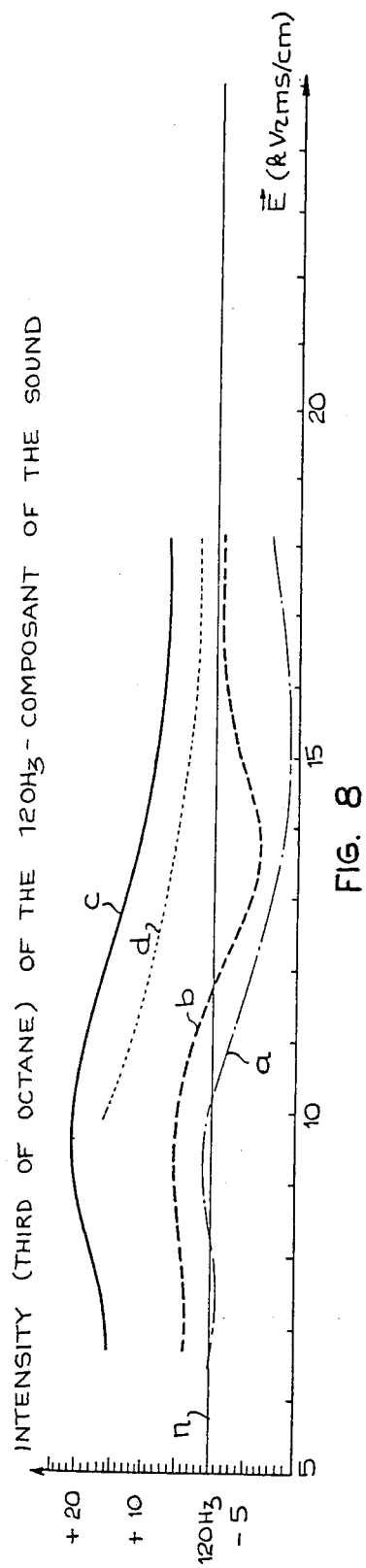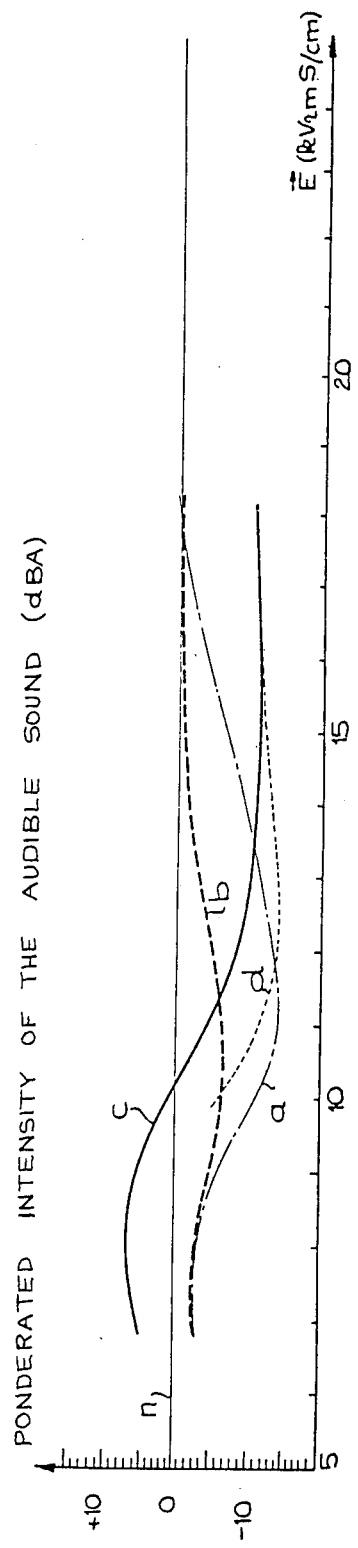

METHOD AND APPARATUS FOR ELIMINATING PULSATORY DISCHARGES OF THE CORONA EFFECT ALONG AN ELECTRIC POWER LINE WHEN THE CONDUCTORS ARE WET

BACKGROUND OF THE INVENTION

1. Field of the Invention

The present invention relates to a method for eliminating the partial, pulsatory discharges of the corona effect along the metallic conductors of an aerial, high voltage electric power transmission line when these conductors are wet.

The invention also relates to a conductor for an aerial, high voltage power transmission line, which allows the above-mentioned method to be carried out.

2. Description of Related Art

It is well known that a high voltage conductor passing through a gas, strongly ionizes the gas and generates a plurality of phenomenae known as "corona effects".

The generation of the corona effect along a high voltage conductor is explained by the fact that the electrode under voltage generates an electrical field in close proximity to its surface and that an aerial conductor acts with the ground as an electrode and counter-electrode, respectively.

As soon as an aerial conductor is under voltage, it generates an electrical field around its surface. If the so generated electrical field is greater than a given value corresponding to the critical limit of disruption of the air, then local ionization is produced all around the conductor. The more the surface of the conductor is curved, the greater is the ionization. Indeed, it is well known that the value of the electrical field generated by an electrode is a function of the curvature of the surface of the electrode.

When the conductor is maintained under a moderated voltage, there is no ionization of this type. However, if the voltage under which the conductor is maintained increases, the corona effect appears, usually in the form of a multitude of partial, electrical discharges appearing along the whole length of the conductor.

This disruption of the air due to ionization is accompanied in practice with a substantial loss of energy that may take the form of luminescent phenomena (glow-discharge), loss in power electromagnetic interference and/or audible sound.

The luminescent phenomena is due to the emission of photons by the atoms of the air when these atoms are excited by the electrons propulsed by the strong electrical field. The loss in power is due to the dissipation of the energy necessary for the ionization of the atoms, the neutralization of the ions at the surface of the conductor and more particularly, the alternating movement of the charges created in the air in the proximity of the conductor when the current is alternating. The electromagnetic interference is due to the impulses of current circulating along the conductor, which current generates Hertzian waves. Last of all, the audible sound is due to the impulsion phenomena of heating and dilation of the air which causes sonorous waves with a straight front and whose spectrum extends up to 20,000 hertz, that is in the field of the audible frequencies. The sound is also due to the oscillatory movement of the charges in the space in the neighborhood of the conductor when this conductor is maintained under alternating voltage, this phenomena also causing sonorous waves whose frequency is twice the frequency of the voltage, this is 120 hertz.

When use is made of an electrode having a very high surface curvature, the loss of energy by ionization of the air will usually be stationary and calm and will result in a luminescent phenomena, a continuous power loss and a sound whose frequencies are low (centered about 120 hertz) when the current is alternating. This kind of corona effect will be referred to hereinafter as "permanent discharges".

In the other case, for example, when the surface of the conductor has a low curvature, the loss of energy will be sporadic, turbulent and pulsatory and will result in a multitude of pulsatory discharges having a length in the range of about one centimeter and a duration of about 200 nanosecond. A loss in power very important radioelectric perturbations and an audible sound having harmonic component in the low frequencies (120 hertz) and another component whose frequency extends up to the limit of audibility, are produced because of the impulsions.

If, in practice, the above mentioned phenomenae all are very annoying from an economical point of view in the exploitation of the transmission lines because of the power loss they generate, they are more particularly annoying from an ecological point of view and are very detrimental for the persons who live in the neighborhood of the high (or very high) voltage transmission lines. The two particular phenomenae are, on one hand, the electromagnetic perturbations that produce interference in the reception of the modulated Hertzian waves (radio or television) and, on the other hand, the audible sound that is or can be very annoying. As a result, the implantation of a high voltage transmission line in a very specific region, always raises a plurality of very serious problems for the engineers who design the project, in particular when the line is close to crowded areas.

In order to solve the ecological problem, several studies have been carried out in some countries in an attempt to better understand the nature of the corona effect and maintain the various perturbations due to corona effect at the lowest possible level by acting on the factors of influence of the corona effect that are presently known.

These studies have shown that it is possible to reduce the drawbacks associated with the corona effect or their consequences on a given transmission line, by (a) making a judicious selection among the geometrical characteristics of the line for reducing the value of the electrical field at the surface of the conductor; and/or (b) using a bundle of cohductors for artificially reducing the electrical field at the surface of the conductors; and/or (c) avoiding scratching the surface of the conductors during their installation as the very high curvature of each irregularity with respect to the average curvature of the conductor surface creates a punctual zone of strong ionization on the surface of the conductor and thus lowers in a substantial manner the limit at which the corona effect appears.

With a judicious selection of the geometrical characteristics of the line such as the diameter and space arrangement of the conductors, it is almost possible to completely eliminate the drawbacks due to the corona effect, as can be easily noted in practice on most of the existing high voltage transmission lines which, when the weather is fine and the atmosphere is not too much polluted, actually do not generate any perturbations directly attributable to the corona effect.

The second solution proposed hereinabove is also interesting but it involves installation costs that are very high.

If all the above-mentioned solutions have some advantages, they also have a common drawback. This common drawback is that none of these proposed solutions actually controls the main source of iongenerating irregularities, namely the deposit of drops of water onto the surface of the conductors by the rain, drizzle, mist, dew or melting snow. Each drop of water formed on the conductor constitutes an irregularity of the surface of the conductor which substantially increases the local ionization and substantially lowers the limit of the appearance of the corona effect.

This negative effect of the rain is well known by those in charge of the high voltage transmission lines, who know that the corona effect and the electrical loss caused by this effect are almost negligible when the weather is fine but occurs as soon as it rains or the lines are wet.

In this regard, the above-mentioned studies have shown that when it rains, each drop of water falling onto the conductor and adhering to the surface of this conductor, is deformed under the effect of the electrical field and transformed into a small "tip" whose sharp end creates a very important, local ionization. This liquid "tip" is known to generate much more partial, pulsatory discharges than permanent discharges.

As has been previously explained, the corona effect generated by the rain is very annoying for those responsible for the transmission lines because of the electrical loss it causes. This corona effect is also very annoying from an ecological point of view when it takes place in the form of pulsatory discharges instead of permanent discharges, as the pulsatory discharges involve much more acoustical and electromagnetic perturbations than the others.

To solve this drawback directly associated with the rain, several solutions have already been proposed. One of these solutions was experimented with in Belgium by an engineer, Mr. Lecat. It consists of fixing a plurality of small metallic tacks at regular intervals along the conductor. Each of these tacks generates a power glow-discharge at its ends and prevents the generation of partial pulsatory discharges that are the source of electrical and acoustical perturbations when it rains. Although this solution is satisfactory from an ecological point of view, it has however a very important drawback for those in charge of the electrical transmission lines. Indeed, this solution involves the permanent creation of luminescent discharges along the conductor, which, in practice, is not necessary when the conductor is dry and which results in very important power loss along the lines.

Another solution proposed for overcoming the problem due to the rain, consists of making each conductor hydrophobic to ensure a better ejection of the water falling onto its surface. Such a conductor is, however, very difficult to manufacture in practice.

A further proposed solution consists of making each conductor hydrophilic to ensure a better circulation and repartition of the rain onto its surface. This solution has proved to be positive but is not sufficient in practice.

To overcome the problem due to the rain, it has also been proposed to spiral a very thin metallic wire around a bundle of separate conductors. This spiralled wire forms an electrode having a very strong curvature, which extends along the whole length of the bundle and generates a permanent and stable corona effect resulting in permanent discharges not annoying from an ecological point of view. These permanent discharges usually eliminate the production of pulsatory discharges on the bundles even when it rains. This solution, as the first solution described hereinabove, has the important drawback of generating a corona effect in a permanent manner, along the whole length of the conductor, such being in practice not necessary when the conductor is dry and moreover, generating a substantial excess in power loss.

SUMMARY OF THE INVENTION

The object of the present invention is to provide a new method of solving the above-mentioned problem associated with the rain. More particularly, the object of the present invention is to provide a method for discharging the energy of the corona effect appearing on the metallic conductors of an aerial high voltage transmission line in the form of permanent discharges rather than in the form of pulsatory discharges, only when the conductors are wet.

Thus, the object of the present invention is to provide a method for eliminating the partial pulsatory discharges of the corona effect on the metallic conductors on an aerial, high voltage transmission line when the conductors are wet, which method ensures a unique shielding of the conductors by generation of permanent discharges that are not annoying from an ecological point of view in lieu of annoying pulsatory discharges, only when it rains and the conductors are wet, and thus to avoid the unnecessary electrical loss due to an unnecessary shielding of the conductors when these conductors are dry.

The method according to the invention comprises the steps of fixing onto each conductor a strip of non-conductive, fibrous material having a capillary effect with respect to water in such a manner that this fibrous material is in close contact with the conductor. The capillary effect of the so fixed fibrous material ensures the formation of a multitude of very small filaments of water on the surface of the conductor when it rains, and thus the generation of a corona effect in the form of permanent discharges resulting in non-annoying luminescent phenomenae rather than in the form of pulsatory discharges that result in audible sounds and electromagnetic interference.

The first advantage of the method according to the invention of course lies in that there is no electrical loss when the conductor is dry, as compared to the methods or solutions known and used up to now.

Another advantage of the method according to the invention lies in that it reduces the amount of audible sound and electromagnetic interference and thus permits the application of a higher electrical field onto each conductor for an equal quality of environment, and accordingly permits the transmission of more energy along the lines for the same price.

Usually, the conductors used in the transmission lines comprise a plurality of strands of aluminum twisted around a core of steel. In this case, the fibrous material, which can be made of cotton, can be fixed onto each conductor by spiralling the strip around at least one of the external strands on the conductor before twisting this strand with the other external strands to form the conductor. The fibrous material can also be fixed onto each conductor by spiralling the strip around the whole surface of the conductor. A particularly strong arrangement consists in spiralling the strip around one external strand out of two and subsequently twisting the other external strand to form the conductor. Whatever is the chosen solution, it is essential that the fibrous material be in close contact with the conductor or its strands to avoid any breakdown voltage between the strip and the conductor, that may generate very important electromagnetic perturbations. It is also essential that the selected fibrous material has a capillary effect with respect to water, to absorb the rain and to promote the formation of a multitude of sharp veins of water onto or within its fibers or filaments, which veins have a very small diameter. The so-formed veins of water are electrically conductive and they generate a strong ionization which in turn ensures complete shielding of the conductor with respect to the rain.

Another object of the invention is to provide a metallic conductor for an aerial, high voltage transmission line, which permits the above-mentioned method to be carried out.

The conductor according to the invention comprises a strip of a non-conducting fibrous material spiralled onto its surface and having a capillary effect with respect to water. This strip of fibrous material is fixed directly onto the surface of the conductor so as to be in close contact therewith. The strip of fibrous material can be spiralled around at least one of the external strands of the conductor or it can be spiralled around the whole surface of the conductor. Preferably, the fibrous material will be spiralled about the conductor except for one external strand out of two or one external strand out of three or four.

DETAILED DESCRIPTION OF THE DRAWINGS

The invention and its advantages will be better understood with reference to the following nonrestrictive description of preferred embodiments thereof, taken in connection with the accompanying drawings in which:

FIG. 1 shows a portion of a metallic conductor provided with the prior art system invented by Lecat for eliminating the pulsatory discharges of the corona effect;

FIG. 2 shows a portion of a metallic conductor according to the present invention;

FIG. 3 is a cross-sectional view of the conductor shown in FIG. 2;

FIG. 4 is a cross-sectional view of another embodiment of the present invention;

FIG. 6 is a diagram giving the value of the electrical loss generated by a hydrophilic conductor, a hydrophobic conductor, an ion generating conductor and a conductor according to the present invention under a rain of 2 cm per hour, as a function of the value of the electrical field;

FIG. 7 is a diagram giving the value of the electromagnetic interference generated by the four conductors of FIG. 6 as a function of the value of the electrical field, under a rain of 2 cm per hour;

Figure 5:
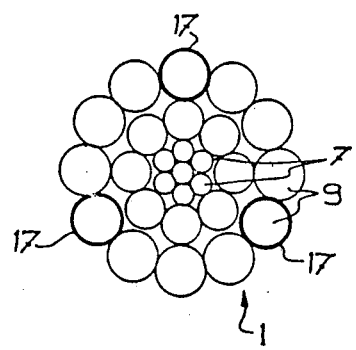
FIG. 5 is a cross-sectional view of a further embodiment of the present invention.

FIG. 8 is a diagram giving the value of the intensity of the 120 hertz component of the audible sound generated by each of the four conductors of FIG. 6, as a function of the value of the electrical field under a rain of 2 cm per hour; and FIG. 9 is a diagram giving the value of the audible sound generated by each of the four conductors of FIG. 6, as a function of the value of the electrical field under a rain of 2 cm per hour.

DESCRIPTION OF THE PREFERRED EMBODIMENTS

FIG. 1 of the drawing shows a portion of an aerial, high voltage electrical conductor 1 having a conventional structure. This conductor 1 comprises a core 3 having a small diameter, which core comprises a plurality of strands of galvanized steel 7 twisted together, and by a plurality of electrically conductive layers 5. Each layer comprises a plurality of strands of aluminum 9 having a diameter superior to that of the steel strands 7. In the same manner as the strands of the steel core 3 the strands 9 of each conducting layer are twisted together around the core 3 of the conductive layer immediately inferior thereto, preferably in a direction contrary to the direction in which the inferior layer of the core of the conductor has been twisted, until the nominal diameter of the conductor is achieved. The steel core 3 is used to give sufficient mechanical support to the conductor 1, which support would not be obtained with strands of aluminum only because of the ductility of this metal.

The conductor 1 is usually not insulated but suspended and connected to its supporting towers by a group of insulators. As a result, as soon as the conductor 1 is under voltage, it acts as an electrode with respect to the ground and creates an electrical field in close proximity to its surface. When this electrical field becomes higher than a given value corresponding to the critical limit of disruption of the air, then there is generation of a local ionization all around the conductor and generation of the above-mentioned phenomenae known under the generic name of "corona effect".

The general shape of the conductor, its diameter and its spacing with respect to the other conductors are usually selected by those who construct the transmission lines, so as to reduce to a maximum extent the production of the corona effect and the electrical loss it creates. This selection is done by using the above-mentioned practical knowledge that is available regarding this corona effect. This selection is generally sufficient to avoid the generation of most of the perturbations due to the corona effects along the conductors of a high voltage or very high voltage transmission line when the weather is fine and the atmosphere is not too much polluted (and accordingly is not a source of irregularities that may deposit on the surfaces of conductors and generate a strong ionization).

However, this selection is not sufficient when it rains, for the various reasons that have been explained hereinabove. As a matter of fact, as soon as a plurality of drops of water fall onto the surface of a conductor, there is generation of a corona effect. Unfortunately, this phenomena cannot be eliminated, unless the conductor is substantially oversized, which is not economical in practice. If this phenomena cannot be eliminated, it may however be controlled to make the generated corona effect as least annoying as possible, in particular for the environment. The simplest method for making this phenomena less annoying is to influence the development thereof by promoting the production of permanent discharges which result essentially in electrical loss and luminescent glows while simultaneously reducing the production of pulsatory discharges which result also in electrical loss in addition to generating audible sounds that are very annoying for those living in the neighborhood of the lines, and radioelectric interference that is also annoying for tele- or radio-communications.

FIG. 1 of the drawings illustrates one of the prior art methods used for controlling the corona effect. This method, which was invented in Belgium by Mr. Lecat, consists of fixing a multitude of pairs 11 of small stirrups 15 and 15' made of a metal wire having a very small diameter, at regular intervals along the conductor 1. The branches 13 and 13' of the stirrups 15 and 15' are shaped and spaced apart in such a manner as to form four "tips" extending radially around the conductor 1 when the stirrups are mounted opposite to each other at one point of the conductor. The tips 13 and 13' which radially extend from the conductor and whose ends have very strong curvatures, produce a very strong ionization of the air near their ends and therefore generate luminescent discharges having a strong intensity which ensures a complete shielding of the conductor and makes it efficient independently of atmospheric conditions by producing non-annoying permanent-discharges which, when it rains, are substituted for the pulsatory discharges that are very annoying for the environment and are usually generated by the drops of water adhering to the conductor. Although it is satisfactory, this solution has the major drawback of generating a corona effect in a permanent manner on the conductor, whether it rains or not, and consequently to create a substantial excess of electrical loss that would not exist in the absence of stirrups when the weather is fine and the conductors are dry.

The purpose of the method according to the present invention is also to control the corona effect. However, the method according to the present invention differs from the above method as well as from any other known method in that it ensures a complete ionic shielding of each conductor by generation of non-annoying, permanent discharges to the detriment of annoying pulsatory discharges only when it rains and the conductors are wet. Thus, the method according to the present invention eliminates any unuseful electrical loss due to an unnecessary shielding of the conductors when the conductors are dry.

With particular reference to FIGS. 2 to 5, the method according to the invention comprises the step of fixing on the conductor 1, a strip of non-conductive, fibrous material 17 having a capillary effect with respect to water so that fibrous material 17 will be in close contact with the conductor. In accordance with the embodiment shown on FIGS. 2 and 3, the fibrous material 17 is fixed in close contact with the conductor 1 by spiralling the strip around the conductor before twisting one external strand 9p out of two. The strip 17 is thus spiralled around half of the strands of the external conductive layer of the conductor 1, such as, for example, around the odd strands 9i before the other half of the strands, namely the even strands 9p, are twisted or retwisted with the others.

In accordance with the embodiment shown on FIG. 4, the strip of fibrous material 17 is spiralled around the conductor before twisting three external strands out of four with the others. Of course, this can also be done by spiralling the fibrous material before twisting two strands out of three or four strands out of five, although a too large spacing between the strips of fibrous material around the conductor may affect the efficiency of the method.

In accordance with another embodiment shown on FIG. 5, the fibrous material 17 is fixed in close contact with the conductor by spiralling the strip around several external strands 9 before twisting these strands or putting these strands back in place with the other strands to form the conductor. Each strand is covered with the fibrous material independently of the other and put in place subsequently. In the illustrated embodiment, three strands symmetrically spaced apart around the conductor are covered with fibrous material 17.

In any case, it is compulsory that a close contact be ensured between the fibrous material 17 and the surface of the conductor 1 to avoid any breakdown that may generate very important electromagnetic perturbations which in turn could affect in a very substantial manner the efficiency of the conductor even when dry.

It is also compulsory that the strip of fibrous material spiralled around the conductor be made of a non-conductive substance having a capillary effect with respect to water.

The non-conductivity that the fibrous material 17 must have can easily be understood. Indeed, if the fibrous material 17 was conductive, it is obvious that this material would cause electrical loss by corona effect in a permanent manner, which is particularly to be avoided.

The capillary effect that the fibrous material 17 must have is less obvious than its non-conductivity. However, this capillary effect is a very important characteristic of the invention, which is compulsory to satisfactorily carrying out the method according to the invention. Indeed, to allow the fibrous material 17 to shield the conductor 1 when this conductor is wet, it is compulsory that the fibers of the fibrous material 17 absorb and retain the water in the form of very thin filaments or veins of water that create a multitude of small ionizing tips which in turn ensure a strong ionization of the air all around the conductor 1. This ionization which occurs only when it rains, substantially reduces the level of the limit at which the corona effect appears and thus ensures production of the corona effect in the shape of permanent discharges that are not annoying instead of ensuring this effect in the shape of pulsatory discharges that give annoying sounds and electromagnetic perturbations.

As the non-conductive fibrous material 17 having a good capillary effect, any suitable fabric, such as a cotton fabric, may be used. Actually, any fabric having a capillary effect with respect to water could be used. Preferably, however, use should be made of fabrics known for their resistance and durability, such as synthetic fabrics that are known to resist UV light and aging phenomena.

With respect to the wear of the fibrous material 17 by ions, it can be noted that, on one hand, the fibrous material 17 is activated only when the conductor is wet and, on the other hand, the luminescent or glow discharges seem to be located on the surface of the material, above the electromechanical deformation of the water held in the capillary volume of the fibers of the fibrous material. Therefore, it can be assumed that a material already known for its resistance will easily support the stress that is required for carrying out the method according to the invention.

It is obvious that the efficiency of conductor 1 covered with a cotton material 17 as shown on FIG. 2, will be at least identical when wet to the efficiency of a hydrophilic conductor, since the cotton absorbs the water. However, it has been surprisingly found that such a conductor covered with a cotton fabric, when wet, also has the advantages of the conductors shielded by some ion generating means known for promoting luminescent discharges, such as the prior art shielding shown on FIG. 1 or the metal wire spiral used for shielding the bundle, without having their drawbacks when the weather is fine and the conductors are dry. These advantages clearly appear from the tests carried out in laboratory and reported in the diagrams of FIGS. 6 to 9. These results were obtained with four portions of conductors that were respectively only hydrophilic (curves a), only hydrophobic (curves b), provided with ion generating means (curves c), and covered with a cotton fabric according to the invention (curves d) under a rain corresponding to a precipitation of 2 cm per hour. The results reported in the diagrams are relative, which means that they are given with respect to a value corresponding to the results obtained with a standard conductor in a good condition (straight lines n).

The diagram of FIG. 6 gives the value of the electrical loss as a function of the value of the root mean square of the electrical field expressed in kilovolts per cm. This diagram shows that the conductor according to the present invention (curve d) reacts under the rain substantially in the same manner as an ion-generating conductor (curve c). It creates substantial electrical loss as compared to the hydrophilic and hydrophobic conductors (curves a and b). This diagram, however, shows that this loss decreases as the field increases, such being particularly advantageous since use is presently made of transmission lines under higher and higher voltage.

The diagram of FIG. 7 shows the relative value in decibels of the radioelectric interferences measured as a function of the value of the electrical field expressed in kV rms per cm. This diagram shows that the conductor according to the present invention (curve d) is not as efficient as the ion-generating conductor (curve c) but nevertheless it generates much less interference than the hydrophilic and hydrophobic conductors (curves a and b) which, at about 15 kV rms/cm under the given conditions of rain, generate at least the same and even more interference than the standard conductor (curve n).

The diagram of FIG. 8 shows the value in decibels of the intensity of the component at 120 Hz of the sound generated by the conductors as a function of the value of the electrical field expressed in kV rms per cm. This diagram also shows that the conductor according to the present invention (curve d) reacts under the rain substantially in the same manner as the ion-generating conductor (curves c). Under a low electrical field, the conductor according to the invention generates more sound at 120 Hz than a standard conductor, but the intensity of this sound decreases as the field increases. It may be mentioned here that the fact that the sound generated at 120 Hz is possibly high, is not annoying in practice for the environment, since this stable sound is less annoying than the random-type noise due to pulsatory discharges.

Last of all, the diagram of FIG. 9 shows the integrated value in decibels of the intensity of the sound generated by the conductors in the whole range of audible frequencies, as a function of the value of the electrical field expressed in kV rms per cm. This diagram also shows that the conductor according to the present invention (curve d) reacts under the rain substantially in the same manner as the ion-generating conductor (curve c). Contrary to the hydrophilic and hydrophobic conductors (curves a and b), the conductor according to the present invention generates much less audible sound as compared to a standard conductor (curve n), even when the electrical field increases.

The above diagrams thus show that the efficiency of the conductor according to the present invention ranges between the efficiency of the ion-generating conductor known for its major advantage with respect to the environment, and the efficiency of the hydrophilic conductor, known for its good efficiency under rain but at intermediate electrical field values. The main advantage of the conductor according to the present invention, therefore, lies in that, when the surface of the conductor is dry, its efficiency is substantially identical to the efficiency of a standard conductor. However, as soon as it rains, the conductor according to the present invention reacts as an ion-generating conductor, which is known to advantageously reduce the electromagnetic interference and audible sound even under very high electrical field. The method according to the present invention, therefore, permits the generation of ions for shielding the conductor exclusively when it rains and, therefore, takes advantage of the two solutions known for reducing interference, namely the hydrophilic and ion generation methods. This characteristic makes the conductor according to the present invention particularly useful when a very high electrical field is used. That is, the two main sources of ecological nuisance caused by the corona effect, namely radioelectric interference and audible sounds, are substantially reduced.

Of course, other modifications can be made to the present invention whose scope is limited only by the following claims.

I claim:

1. A line for use as an aerial, high voltage electric power transmission line, comprising:
   a metallic conductor;
   a strip of fabric made from a non-conductive, fibrous material having fibers capable of absorbing water by capillary action and retaining said water in the form of very thin filaments or veins of water forming a multitude of small tips all over the surface of the fabric, said strip being attached to the outer surface of the said conductor so that the fibers of the fabric are in close contact with said conductor and exposed to the environment free of any conductive material for shielding the fibers of the fabric so that the capillary effect of said fibers ensures the formation of a multitude of small water tips exposed to the environment having a very strong ionizing effect all over the surface of the fabric and therefore on the surface of the conductor when said conductor is wet, said multitude of ionizing tips appearing only when it rains, substantially reducing the level of the limit at which the corona effect appears and thus ensuring production of said corona effect in the shape of permanent glow-discharges instead of partial pulsatory discharges.

2. A line for use as an aerial high voltage electric power transmission line according to claim 1, wherein said conductor comprises a plurality of strands of aluminum twisted about a core of steel, and wherein said strip of non-conductive, fibrous material is spiralled about at least one external strand of said conductor.

3. A line for use as an aerial high voltage electric power transmission line according to claim 1, wherein said conductor comprises a plurality of strands of aluminum twisted about a core of steel, and wherein the strip of non-conductive, fibrous material is spiralled about said strands.

4. A line for use as an aerial high voltage electric power transmission line according to claim 3, wherein the fibrous material is spiralled about the external strands of the conductor and interleaved between adjacent external strands.

5. A line for use as an aerial high voltage electric power transmission line according to claim 3, wherein the strip of non-conductive, fibrous material is spiralled about external strands of the conductor and interleaved between every fourth strand.

6. A line for use as an aerial high voltage electric power transmission line according to claim 1, 2, or 3, wherein the fibrous material is made of cotton.

* * * * *